United States Patent
Kuwahara et al.

(10) Patent No.: US 8,259,403 B2
(45) Date of Patent: Sep. 4, 2012

(54) OBJECTIVE AND ASSEMBLING METHOD FOR THE SAME

(75) Inventors: Masashi Kuwahara, Ina (JP); Noriyuki Sugizaki, Ina (JP)

(73) Assignee: Olympus Corporation, Tokyo (JP)

( * ) Notice: Subject to any disclaimer, the term of this patent is extended or adjusted under 35 U.S.C. 154(b) by 38 days.

(21) Appl. No.: 13/018,518

(22) Filed: Feb. 1, 2011

(65) Prior Publication Data

US 2011/0199695 A1    Aug. 18, 2011

(30) Foreign Application Priority Data

Feb. 15, 2010    (JP) ................. 2010-030451

(51) Int. Cl.
*G02B 7/02* (2006.01)
*G02B 15/14* (2006.01)
*G03B 17/00* (2006.01)

(52) U.S. Cl. ........ 359/823; 359/813; 359/822; 359/830; 359/819; 359/694; 359/704; 359/706; 348/345; 396/73

(58) Field of Classification Search .............. 359/819, 359/823, 830, 694, 695, 700–706; 348/344, 348/345, 360, E5.024; 396/72–75; 74/640
See application file for complete search history.

(56) References Cited

U.S. PATENT DOCUMENTS

| | | | |
|---|---|---|---|
| 5,086,312 A * | 2/1992 | Tanaka et al. | 396/75 |
| 5,243,467 A * | 9/1993 | Tanaka | 359/694 |
| 5,894,372 A * | 4/1999 | Kanno | 359/823 |
| 6,661,589 B2 * | 12/2003 | Takanashi et al. | 359/819 |
| 6,738,198 B2 * | 5/2004 | Kashiwaba et al. | 359/704 |
| 6,768,599 B2 * | 7/2004 | Takanashi et al. | 359/819 |
| 7,061,699 B2 * | 6/2006 | Watanabe et al. | 359/819 |
| 7,092,171 B2 * | 8/2006 | Kawaguchi | 359/704 |
| 7,102,837 B2 * | 9/2006 | Hamasaki et al. | 359/823 |
| 2004/0156124 A1 | 8/2004 | Okada | |

FOREIGN PATENT DOCUMENTS

| | | |
|---|---|---|
| JP | 51-110346 A | 9/1976 |
| JP | 2000-089076 A | 3/2000 |
| JP | 2004-219608 A | 8/2004 |
| JP | 2007-328064 A | 12/2007 |
| JP | 2009-53339 A | 3/2009 |
| JP | 2009-053339 A | 3/2009 |

OTHER PUBLICATIONS

Partial European Search Report (PESR) dated Apr. 11, 2011 (in English) in counterpart European Application No. 11000827.3.
Extended European Search Report (EESR) dated Aug. 8, 2011 (in English) in counterpart European Application No. 11000827.3.

* cited by examiner

*Primary Examiner* — Loha Ben

(74) *Attorney, Agent, or Firm* — Holtz, Holtz, Goodman & Chick, PC

(57) ABSTRACT

An objective comprises: a first group including a plurality of lens groups arranged at a predetermined interval; a second group composed of a single lens-group; a pressing ring which is screwed in, the pressing ring being for fixing the first group; and an outer frame accommodating the first group, the second group, and the pressing ring, wherein the outer frame includes a first hole at a position facing the second group.

10 Claims, 5 Drawing Sheets

OBJECTIVE AND ASSEMBLING METHOD FOR THE SAME

CROSS REFERENCE TO RELATED APPLICATIONS

This application is based upon and claims the benefit of priority from the prior Japanese Patent Application No. 2010-030451, filed Feb. 15, 2010, the entire contents of which are incorporated herein by this reference.

BACKGROUND OF THE INVENTION

1. Field of the Invention

The present invention relates to an objective and to an assembling method for it.

2. Description of the Related Art

An objective is usually designed so that a desired performance is achieved using a plurality of lenses. However, when a plurality of lenses which were manufactured in accordance with a design are actually assembled, the desired performance is sometimes not achieved due to manufacturing errors and the like in the thickness and the curvature of the lenses, which occur in the manufacturing process.

In objective assembling processes, therefore, in order to suppress performance degradations due to manufacturing errors or the like, various adjustments are generally performed, such as an eccentricity adjustment for adjusting the eccentricity of lenses and an interval adjustment for adjusting the intervals between lenses.

As an example, Japanese Laid-open Patent Publication No. 2009-53339 discloses a method in which a force is applied to a lens frame (an inner frame) by inserting an adjustment screw into an adjustment hole (a threaded hole) provided at the housing (the outer frame) of an objective, thereby adjusting the eccentricity of the lens.

By performing various adjustments including such an eccentricity adjustment, desired performances of an objective can be achieved.

Japanese Laid-open Patent Publication No. 2009-53339 discloses the configuration of an objective in which lenses and separation rings (interval rings) are alternately arranged along the optical axis within a housing and a female thread at the housing and a male thread at a pressing ring are screwed together so that the pressing ring fixes the lenses and the separation rings.

In regard to the objective disclosed in Japanese Laid-open Patent Publication No. 2009-53339, lenses and separation rings apply optical-axis-direction forces to each other using a holding force received from the pressing ring, and therefore they are fixed at predetermined positions within the housing. In other words, the lenses are not individually fixed within the housing, but all of the lenses are collectively held and fixed within the housing.

SUMMARY OF THE INVENTION

One aspect of the present invention provides an objective comprising: a first group including a plurality of lens groups arranged at a predetermined interval; a second group composed of a single lens-group; a pressing ring which is screwed down and which fixes the first group; and an outer frame accommodating the first group, the second group, and the pressing ring, wherein the outer frame includes a first hole at a position facing the second group.

Another aspect of the present invention provides an objective assembling method, the method comprising: inserting a plurality of lens groups into an outer frame; screwing down a pressing ring, and fixing the plurality of lens groups within the outer frame by using the pressing ring; and locating, within the outer frame, a single lens-group of which eccentricity is to be adjusted.

BRIEF DESCRIPTION OF THE DRAWINGS

The present invention will be more apparent from the following detailed description when the accompanying drawings are referenced.

DESCRIPTION OF THE PREFERRED EMBODIMENTS

Embodiments will be described in the following with reference to the drawings.

<Embodiment 1>

Figure 1:
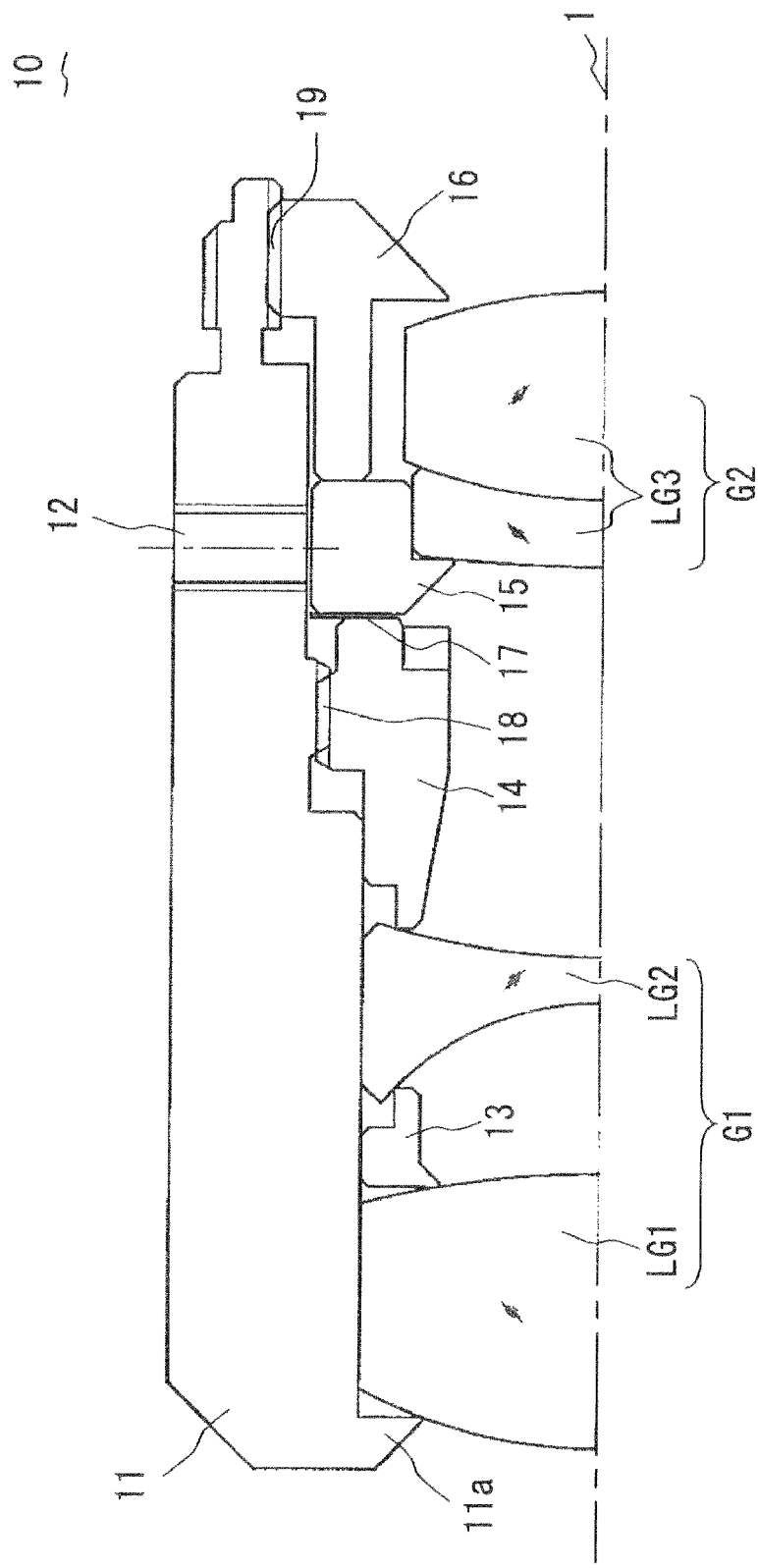
FIG. 1 is a cross-sectional view illustrating a configuration of an objective according to embodiment 1.

FIG. 1 is a cross-sectional view illustrating a configuration of an objective according to the present embodiment.

The upper portion and the lower portion of the objective form symmetrical structures with respect to an optical axis 1; accordingly, the cross section of only one of the two divisions of the objective is shown in FIG. 1, wherein the two divisions are symmetrical with respect to the optical axis 1.

First, the configuration of an objective 10 according to the present embodiment will be described.

The objective 10 illustrated in FIG. 1 has an essentially cylindrical shape and includes: an outer frame 11 having a threaded hole 12; a plurality of lens groups accommodated in the outer frame 11 (i.e., a lens group LG1, a lens group LG2 and a lens group LG3 arranged in this order along an optical axis 1 (the lens group LG1 is closer to the object than the other lenses are)); an interval ring 13; a pressing ring 14; an inner frame 15; a pressing ring 16; and an interval adjustment member 17. The interval adjustment member 17 may be omitted if it is not necessary to use it.

The term "lens group" herein indicates a lens lump irrespective of whether it is a single lens or a cemented lens. Therefore, although the lens groups LG1 and LG2 of the objective 10 are each formed as a single lens, they may also be configured as cemented lenses. Similarly, although the lens group LG3 is formed as a cemented lens, it may also be configured as a single lens.

In this document, a plurality of lens groups which are included in the plurality of lens groups of the objective and for which eccentricity adjustment is not performed are referred to as a first group G1, and a single lens-group for which eccentricity adjustment is performed is referred to as a second group G2. In the assembling process, in the objective 10, eccentricity adjustment is performed on the lens group LG3 which is the closest to the image. Therefore, the first group G1 of the objective 10 includes the lens groups LG1 and LG2, and the second group G2 of the objective 10 is composed of the lens group LG3. The first group G1 can also include more than two lens groups.

The first group G1 includes a plurality of lens groups arranged at a predetermined interval, and is fixed by the pressing ring 14. More specifically, the interval ring 13 for providing a predetermined interval between lens groups is located between the lens groups LG1 and LG2. The lens group LG1, the interval ring 13 and the lens group LG2 are held by the pressing ring 14 and a projection 11a of the outer frame 11. The pressing ring 14 is mounted at a screw part 18 of the outer frame 11. In other words, the pressing ring 14 has a male thread on its outer surface; by screwing down the male thread into the outer frame 11 having a female thread (this is called screw-in fixing), a predetermined holding force directed in the optical axis 1 direction is generated. This force can fix the first group G1.

Meanwhile, the second group G2 is composed of the lens group LG3 for which eccentricity adjustment is performed, and the lens group LG3 (the second group G2) is fixed at the inner frame 15 supporting the lens group LG3. The pressing ring 16 is mounted at a screw part 19 of the outer frame 11. The inner frame 15 supporting the lens group LG3 (the second group G2) is fixed via the pressing ring 14 and the pressing ring 16 holding it.

In regard to the objective 10, an example is indicated in which the lens group LG3 is fixed at the inner frame 15 using an adhesive; however, the method for fixing the lens group LG3 is not particularly limited to this. As an example, the lens group LG3 can also be held by the inner frame 15 and the pressing ring 16. In this case, the pressing ring 16 does not have the screw part 19 and can also be configured as a pressing ring that is not screwed down. In addition, it is also possible to provide a new pressing ring having the screw part 19 so as to hold the lens group LG3 and the pressing ring 16 by using the inner frame 15 and this new pressing ring.

The interval adjustment member 17 for adjusting the interval between the lens groups LG2 and LG3 is placed between the pressing ring 14 and the inner frame 15. In accordance with a necessary interval, a plurality of interval adjustment mechanisms 17 may be set down, or a plurality of interval adjustment mechanisms 17 each having a different thickness may be selectively used. As an example, a foil, a washer, a shim, or the like is used as the interval adjustment mechanism 17.

The threaded hole 12 (a first hole) is provided at a position at which it faces the inner frame 15 supporting the second group G2 (the lens group LG3), i.e., a position at which it faces the second group G2 (the lens group LG3). The threaded hole 12 is formed so that it is essentially orthogonal to the optical axis 1, and it serves as an adjustment hole (the first hole) used in eccentricity adjustment on the lens group LG3.

Although a configuration including the threaded hole 12 serving as an adjustment hole is illustrated in FIG. 1, the configuration is not particularly limited to this. Instead of the threaded hole 12, a through-hole can also be provided as an adjustment hole into which a prodding stick for prodding the inner frame 15 is inserted.

Figure 2:
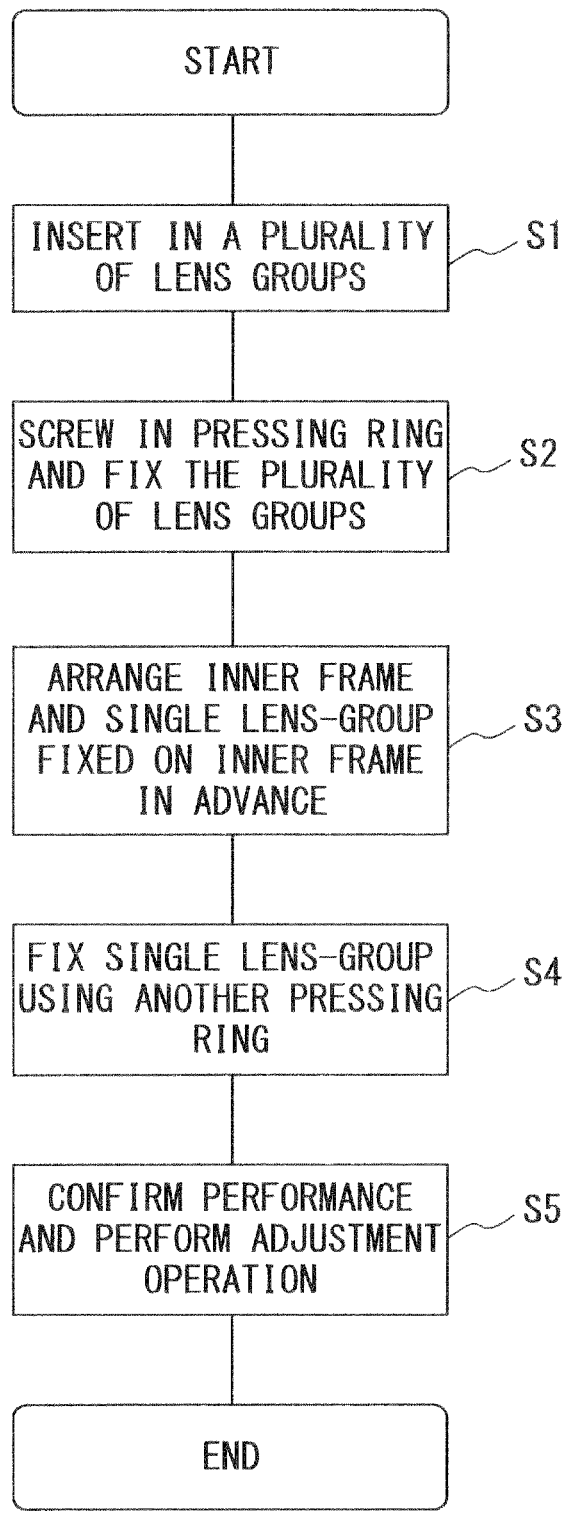
FIG. 2 is a flowchart illustrating an assembling method of the objective according to embodiment 1.

FIG. 2 is a flowchart illustrating an assembling method of the objective 10 according to the present embodiment. With reference to FIG. 2, the assembling method of the objective 10 will be described.

First, in step S1, the outer frame 11 is made so that the projection 11a faces the bottom, and then the lens group LG1, the interval ring 13, and the lens group LG2 are inserted in sequence from the image side into the outer frame 11. In this case, the lens group LG1, the interval ring 13, and the lens group LG2 are not joined together using an adhesive or the like, but are simply stacked on the projection 11a.

Next, in step S2, the pressing ring 14 is inserted from the image side into the outer frame 11 so that it is screwed into the outer frame 11. The pressing ring 14, mounted on the screw part 18, fixes the lens group LG1, the interval ring 13, and the lens group LG2 within the outer frame 11.

In step S3, the interval adjustment member 17, the inner frame 15, and the lens group LG3 are inserted from the image side into the outer frame 11 so that they are stacked on the pressing ring 14. In addition, the inner frame 15 is placed at a position at which it faces the threaded hole 12. Before the lens group LG3 is inserted into the outer frame 11, it is bonded to and fixed on the inner frame 15 using an adhesive or the like; however, the process is not particularly limited to this. It is also possible to place only the inner frame 15 within the outer frame 11 and then to insert the lens group LG3 into the outer frame 11 so as to fix it on the inner frame 15.

In step S4, the pressing ring 16 is inserted from the image side into the outer frame 11 so that it is screwed into the outer frame 11. As a result of this, the inner frame 15 is held by the pressing ring 14 mounted on the screw part 18 and the pressing ring 16 mounted on the screw part 19, and the lens group LG3 fixed on the inner frame 15 is fixed within the outer frame 11.

In step S5, it is confirmed whether or not the assembled objective 10 achieves a desired performance, and when performance degradation is recognized, various adjustments are performed.

An eccentricity adjustment method used in the assembling process of the objective 10 will be described.

In regard to the objective 10, eccentricity adjustment is performed on the lens group LG3 (the second group G2). The eccentricity adjustment on the lens group LG3 is performed by inserting a screw (not shown) into the threaded hole 12 provided at a position in which it faces the lens group LG3 (and the inner frame 15). In accordance with the rotation amount, the inserted screw can apply a force to the inner frame 15, the force being directed in a direction in which it is essentially orthogonal to the optical axis 1. As a result of this, the eccentricity of the lens group LG3 fixed on the inner frame 15 is adjusted. More specifically, to give an example, deviation and inclining of the optical axis of the lens group LG3 are corrected relative to the optical axis of the other lens groups.

In the objective 10, the inner frame 15 is, via the interval adjustment member 17, in contact with the pressing ring 14 which fixes the first group G1, or if the interval adjustment member 17 is not provided, the inner frame 15 is directly in contact with the pressing ring 14. Therefore, when the inner frame 15 is moved within the outer frame 11 because of the force applied for eccentricity adjustment, a force is also applied to the pressing ring 14. However, when eccentricity adjustment is performed, the pressing ring 14 is screwed into and fixed on the outer frame 11. Therefore, the force applied to the pressing ring 14 does not reach the first group G1.

Therefore, in regard to the objective 10 according to the present embodiment, when eccentricity adjustment is performed on the lens group LG3, the other lens groups are not affected; therefore, the eccentricity adjustment operation for an objective can be performed in a relatively easy manner in the assembling process.

The surface of the interval adjustment member 17 is usually very flat and smooth because of polishing or the like. Therefore, when the interval adjustment member 17 is provided, the inner frame 15 moves more smoothly than in a situation in which the interval adjustment member 17 is not provided, and therefore the relationship between the force applied to the inner frame 15 and the movement amount of the inner frame 15 is easily grasped. In regard to the objective 10, therefore, when the interval adjustment mechanism 17 is located between the pressing ring 14 and the inner frame 15, the eccentricity adjustment operation can be performed more easily.

An interval adjustment method used in the assembling process of the objective 10 will be described.

In regard to the objective 10, interval adjustment is performed for the interval between the lens group LG2 and the lens group LG3, i.e., the interval between the first group G1 and the second group G2. In accordance with a desired interval, interval adjustment may be performed by changing the number of the interval adjustment members 17 located between the pressing ring 14 and the internal frame 15 or may be performed by replacing the interval adjustment member 17 with one having a different thickness. Accordingly, the interval between the lens group LG2 and the lens group LG3 can be adjusted so that it is a described interval.

When the assembled objective 10 is disassembled in order to perform interval adjustment, it is possible to remove only the members that need to be removed for locating the interval adjustment mechanism 17 (i.e., the inner frame 15, the pressing ring 16, and the lens group LG3). This can be performed since the lens group LG1, the lens group LG2, and the interval ring 13, which do not need to be removed, are fixed by the pressing ring 14.

Therefore, in regard to the objective 10 according to the present embodiment, interval adjustment can be performed with a minimal operation, i.e., by disassembling and reassembling the objective within the scope of minimal necessity. Therefore, it is possible to reduce the burden which would be incurred by operations needed for interval adjustment for the objective performed during the assembling process.

In regard to an objective in which all lens groups are collectively fixed, if a certain lens group is removed from the outer frame, the other lens groups cannot remain fixed on the outer frame. Therefore, it is not easy to perform interval adjustment by removing only a lens group desired to be removed; accordingly, when interval adjustment is performed, all lens groups are removed as a rule and the assembling is performed again from the beginning. Therefore, more burden will be incurred in adjusting the interval of the objective than in the case of the objective 10 according to the present embodiment.

In regard to an objective in which lens groups are individually fixed, interval adjustment can be performed by removing only a lens group desired to be removed as with the case of the objective 10 according to the present embodiment.

However, in consideration of the fact that an objective usually includes many lens groups, it is clear that the number of man-hours needed for assembly increases greatly. Similarly, the number of man-hours needed for disassembling also increases. Therefore, in regard to an objective having such a configuration, far greater burden will be incurred from the assembling operation of the objective including interval adjustment than in the case of the objective 10 according to the present embodiment.

As described above, in regard to the objective 10 according to the present embodiment, the adjustment process performed in the assembling process can be simplified by using a pressing ring screwed into the outer frame so as to fix a plurality of lens groups, not including a single lens-group for which eccentricity adjustment is performed. In addition, by performing interval adjustment of the interval between a single lens-group on which eccentricity adjustment is performed and a plurality of lens groups on which eccentricity adjustment is not performed, the burden due to the adjustment operation performed in the assembling process can also be decreased.

The configuration of the objective 10 according to the present embodiment is particularly suitable for an objective with a low magnification whose desired performance can be sufficiently achieved by performing eccentricity adjustment at one location and by performing interval adjustment at one location. However, the configuration can also be used for other types of objectives.

In the present invention, the configuration of the objective 10 in which the outer frame 11 has the projection 11a on the object side and each lens group is inserted from the image side into the outer frame 11 was illustrated; however, the configuration is not particularly limited to this. The outer frame may have a projection on the image side. In the configuration in which the projection is provided on the image side, it is easy to design an objective (an outer frame) that has a thin image-side end. If the image-side end is thin, it is easy to visually check a sample when the objective is placed on a microscope; in that way, sufficient sample visibility can be secured.

In the present embodiment, an example in which the lens group on which eccentricity adjustment is performed is placed closest to the image was given. However, the configuration is not particularly limited to this.

<Embodiment 2>

Figure 3:
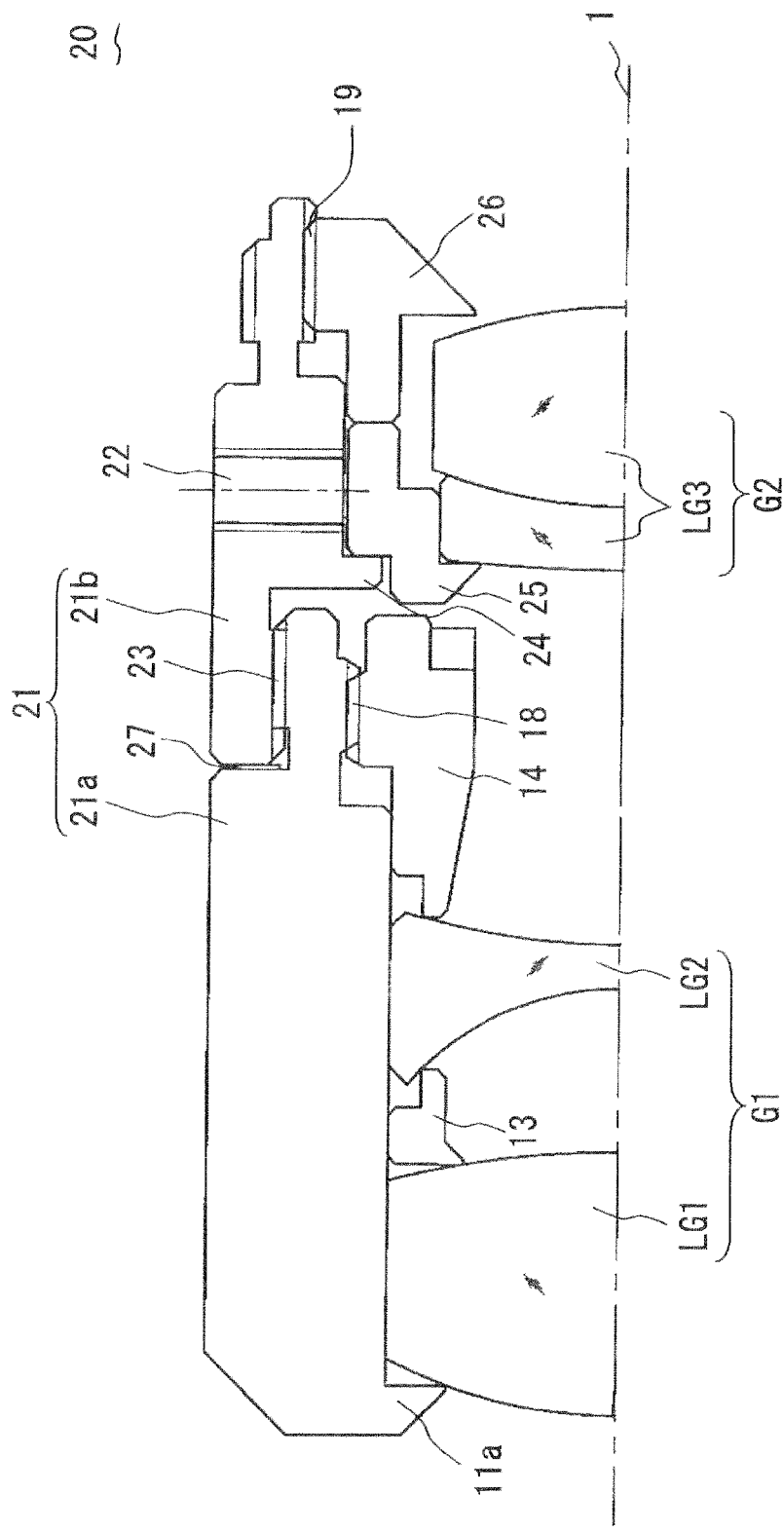
FIG. 3 is a cross-sectional view illustrating a configuration of an objective according to embodiment 2.

FIG. 3 is a cross-sectional view illustrating a configuration of an objective according to the present embodiment.

As with the case in FIG. 1, the cross section of only one of the two divisions of the objective is shown in FIG. 3, wherein the two divisions are symmetrical with respect to the optical axis 1. In FIG. 3, like parts are indicated by like numerals used for the objective 10 illustrated in FIG. 1.

An objective 20 illustrated in FIG. 3 has an essentially cylindrical shape and includes outer frames 21 (a first outer frame 21a and a second outer frame 21b) having a threaded hole 22; a plurality of lens groups accommodated in the outer frames 21 (i.e., a lens group LG1, a lens group LG2, and a lens group LG3 arranged in this order along the optical axis 1 (the lens group LG1 is closer to the object than the other lenses are)); an interval ring 13; a pressing ring 14; an inner frame 25; a pressing ring 26; and an interval adjustment member 27. The interval adjustment member 27 may be omitted if it is not necessary to use it.

In the assembling process, in the objective 20, eccentricity adjustment is performed on the lens group LG3 which is the closest to the image. Therefore, the first group G1 of the objective 20 includes the lens groups LG1 and LG2, and the second group G2 of the objective 20 is composed of the lens group LG3.

In the following, differences will be described between the objective 20 according to the present embodiment and the objective 10 according to embodiment 1.

The objective 20 is different from the objective 10 in the sense that the outer frame 21 includes the first outer frame 21a for accommodating the first group G1 and the second outer frame 21b for accommodating the second group G2 and that the second outer frame 21b is screwed into the first outer frame 21a.

The objective 20 is also different from the objective 10 in the sense that the interval adjustment member 27 for adjusting the interval between the lens groups LG1 and LG2 is located between the first outer frame 21a and the second outer frame 21b.

In addition, the objective 20 is also different from the objective 10 in the sense that since there is a space between the pressing ring 14 for fixing the first group G1 and the inner frame 25 for supporting the lens group LG3 (the second group G2), the pressing ring 14 is not in contact with the inner frame 25. The inner frame 25 is fixed within the second outer frame 21b via the pressing ring 26 and a projection 24 of the second outer frame 21b holding the inner frame 25.

The eccentricity adjustment of the objective 20 is performed on the lens group LG3 (the second group G2) using a method similar to that used for the objective 10. In other words, the eccentricity adjustment of the objective 20 is performed by inserting a screw (not shown) into the threaded hole 22 so as to move the inner frame 25. In the objective 20, since the pressing ring 14 is not in contact with the inner frame 25, a force will not be applied to the pressing ring 14 even when the inner frame 25 moves within the outer frame 21 (the second outer frame 21b).

In regard to the objective 20 according to the present embodiment, therefore, even when eccentricity adjustment is performed on the lens group LG3, the other lens groups are not affected; therefore, as with the case of the objective 10 according to embodiment 1, the eccentricity adjustment operation of an objective can be performed in the assembling process in a relatively easy manner.

The interval adjustment of the objective 20 is performed for the space between the first group G1 and the second group G2 using a method similar to that used for the objective 10, i.e., using an interval adjustment member. In the objective 20, however, the interval adjustment member 27 is located as described above between the first outer frame 21a and the second outer frame 21b. Therefore, when the objective 20 is disassembled for interval adjustment, all that needs to be done is to remove, from the first outer frame 21a the second outer frame 21b on which the inner frame 25, the lens group LG3, and the pressing ring 26 are fixed.

In regard to the objective 20 according to the present embodiment, therefore, a burden which would be incurred from operations needed for the interval adjustment of the objective during the assembling process can be further reduced.

<Embodiment 3>

Figure 4:
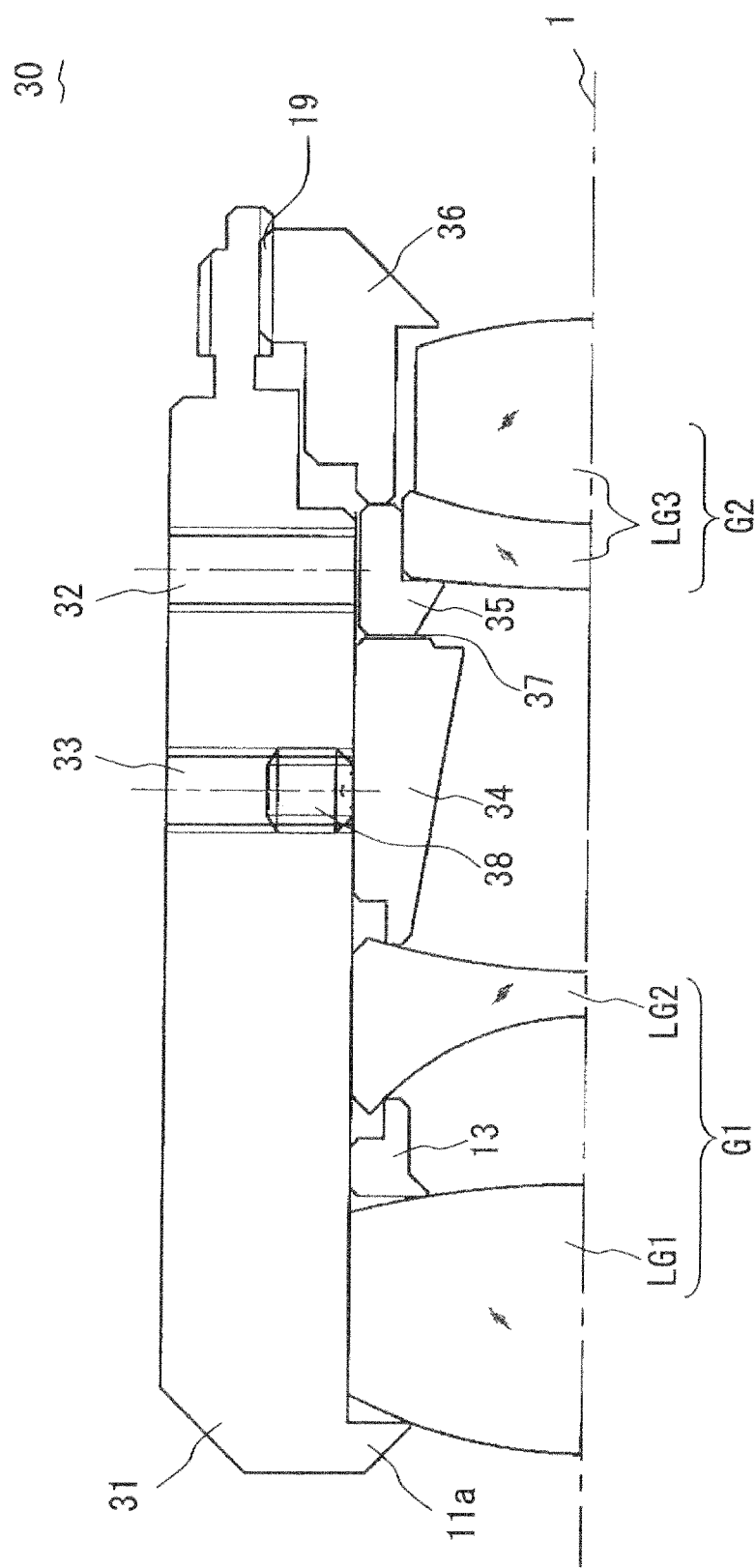
FIG. 4 is a cross-sectional view illustrating a configuration of an objective according to embodiment 3.

FIG. 4 is a cross-sectional view illustrating a configuration of an objective according to the present embodiment. As with the case in FIG. 1, the cross section of only one of the two divisions of the objective is shown in FIG. 4, wherein the two divisions are symmetrical with respect to the optical axis 1. In FIG. 4, like parts are indicated by like numerals used for the objective 10 illustrated in FIG. 1.

An objective 30 illustrated in FIG. 4 has an essentially cylindrical shape and includes: an outer frame 31 having a threaded hole 32 and a threaded hole 33; a plurality of lens groups accommodated in the outer frame 31 (i.e., a lens group LG1, a lens group LG2, and a lens group LG3 arranged in this order along the optical axis 1 (the lens group LG1 is closer to the object than the other lenses are)); an interval ring 13; a pressing ring 34; an inner frame 35; a pressing ring 36; an interval adjustment member 37; and a threaded member 38. The interval adjustment member 37 may be omitted if it is not necessary to use it.

In the assembling process, in the objective 30, eccentricity adjustment is performed on the lens group LG3 which is the closest to the image. Therefore, the first group G1 of the objective 30 includes the lens groups LG1 and LG2, and the second group G2 of the objective 30 is composed of the lens group LG3.

In the following, differences will be described between the objective 30 according to the present embodiment and the objective 10 according to embodiment 1.

The objective 30 is different from the objective 10 in the sense that in addition to the threaded hole 32 provided at a position at which it faces the second group G2 (and the inner frame 35), the outer frame 31 includes the threaded hole 33 provided at a position at which it faces the pressing ring 34 which fixes the first group G1. The threaded hole 32 (the first hole) serves as an adjustment hole used for eccentricity adjustment on the lens group LG3, and the threaded hole 33 (the second hole) is used for inserting the threaded member 38 for fixing the pressing ring 34 on the outer frame 31.

The objective 30 is also different from the objective 10 in the sense that the pressing ring 34 and the outer frame 31 are screwed into the threaded member 38 inserted into the threaded hole 33. In other words, the pressing ring 34 is fixed on the outer frame 31 via the pressing ring 34 being screwed into the threaded member 38 (i.e., not into the outer frame 31), thereby fixing the first group G1 and the interval ring 13. Since the outer frame 31 and the pressing ring 34 are not directly screwed together, a female thread does not need to be formed on the inner surface of the outer frame 31. In the objective 30, therefore, the structure of the inner surface of the outer frame 31 can be simplified.

The eccentricity adjustment of the objective 30 is performed on the lens group LG3 (the second group G2) using a method similar to that used for the objective 10. In other words, the eccentricity adjustment of the objective 30 is performed by inserting a screw (not shown) into the threaded hole 32 so as to move the inner frame 35. In the objective 30, since the inner frame 35 is in contact with the pressing ring 34 directly or via the interval adjustment member 37, a force will also be applied to the pressing ring 34 when the inner frame 35 moves. However, since the pressing ring 34 is fixed on the outer frame 31 as described above, the force applied to the pressing ring 34 does not reach the first group G1.

In regard to the objective 30 according to the present embodiment, therefore, even when eccentricity adjustment is performed on the lens group LG3, the other lens groups are not affected; therefore, as with the case of the objective 10 according to embodiment 1, the eccentricity adjustment operation of an objective can be performed in the assembling process in a relatively easy manner.

The interval adjustment of the objective 30 is performed for the space between the first group G1 and the second group G2 using a method similar to that used for the objective 10.

Therefore, in regard to the objective 30 according to the present embodiment, as with the case of the objective 10 according to embodiment 1, interval adjustment can be performed by disassembling and reassembling the objective within the scope of minimal necessity. Therefore, it is possible to reduce the burden which would be incurred by operations needed for interval adjustment for the objective performed during the assembling process.

<Embodiment 4>

Figure 5:
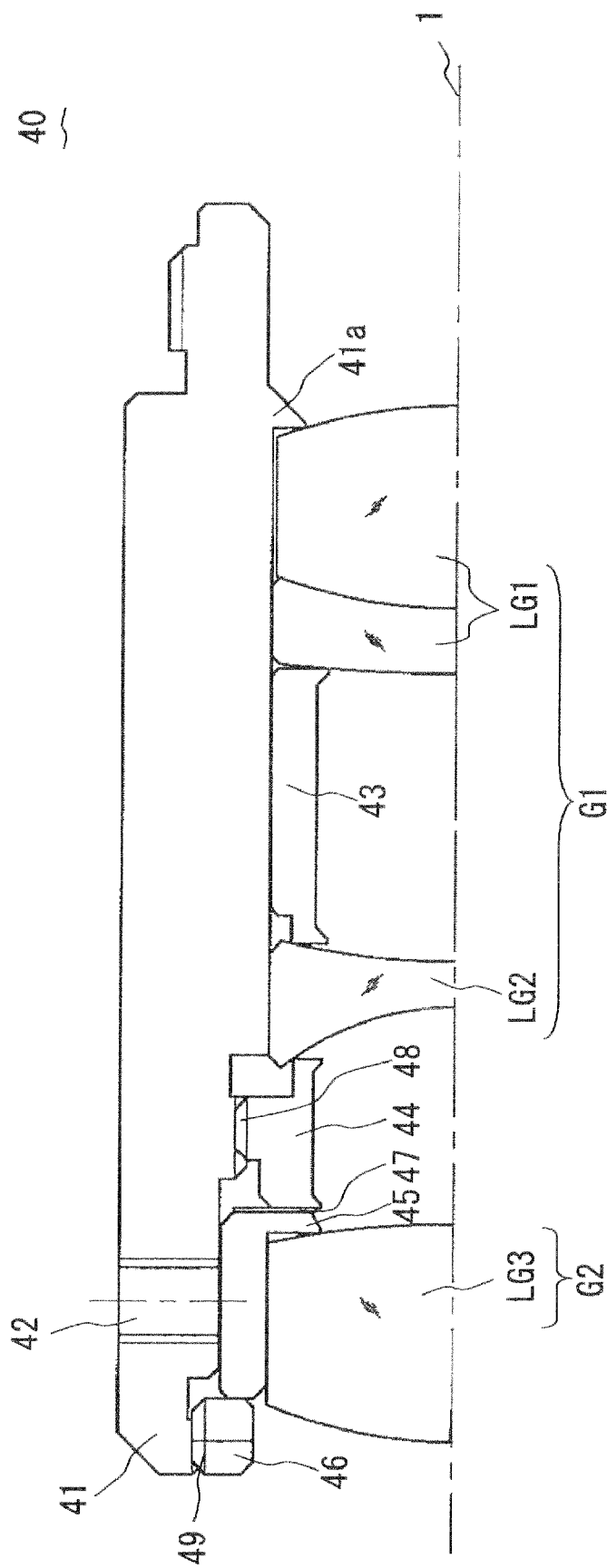
FIG. 5 is a cross-sectional view illustrating a configuration of an objective according to embodiment 4.

FIG. 5 is a cross-sectional view illustrating a configuration of an objective according to the present embodiment. As with the case in FIG. 1, the cross section of only one of the two divisions of the objective is shown in FIG. 5, wherein the two divisions are symmetrical with respect to the optical axis 1.

The objective 40 illustrated in FIG. 5 has an essentially cylindrical shape and includes: an outer frame 41 having a threaded hole 42; a plurality of lens groups accommodated in the outer frame 41 (i.e., a lens group LG1, a lens group LG2, and a lens group LG3 arranged in this order along the optical axis 1 (the lens group LG1 is closer to the image than the other lenses are)); an interval ring 43; a pressing ring 44; an inner frame 45; a pressing ring 46; and an interval adjustment member 47. The interval adjustment member 47 may be omitted if it is not necessary to use it.

In the assembling process, in the objective 40, eccentricity adjustment is performed on the lens group LG3 which is the closest to the object. Therefore, the first group G1 of the objective 40 includes the lens groups LG1 and LG2, and the second group G2 of the objective 40 is composed of the lens group LG3.

In the following, differences will be described between the objective 40 according to the present embodiment and the objective 10 according to embodiment 1.

The objective 40 is different from the objective 10 in the sense that the outer frame 41 has a projection 41a on the image side. Accordingly, the objective 40 is assembled using the following procedure.

First, the outer frame 41 is arranged so that the projection 41a faces the bottom, and then the lens group LG1, the interval ring 43, and the lens group LG2 are inserted in sequence from the object side into the outer frame 41. In this case, the lens group LG1, the interval ring 43, and the lens group LG2 are not joined together using an adhesive or the like, but are simply stacked on the projection 41a.

Next, the pressing ring 44 is inserted from the object side into the outer frame 41 so that it is screwed into the outer frame 41. The pressing ring 44, mounted on the screw part 48, fixes the lens group LG1, the interval ring 43, and the lens group LG2 within the outer frame 41.

Then, the interval adjustment member 47, the inner frame 45, and the lens group LG3 are inserted from the object side into the outer frame 41 so that they are stacked on the pressing ring 44. In addition, the inner frame 45 is placed at a position at which it faces the threaded hole 42. Before the lens group LG3 is inserted into the outer frame 41, it is bonded to and fixed on the inner frame 45 using an adhesive or the like; however, the process is not particularly limited to this. It is also possible to place only the inner frame 45 within the outer frame 41 and then to insert the lens group LG3 into the outer frame 41 so as to fix it on the inner frame 45.

Finally, the pressing ring 46 is inserted from the object side into the outer frame 41 so that it is screwed into the outer frame 41. As a result of this, the inner frame 45 is held by the pressing ring 44 mounted on the screw part 48 and the pressing ring 46 mounted on the screw part 49, and the lens group LG3 fixed on the inner frame 45 is fixed within the outer frame 41.

The eccentricity adjustment of the objective 40 is performed on the lens group LG3 (the second group G2) using a method similar to that used for the objective 10.

In regard to the objective 40 according to the present embodiment, therefore, even when eccentricity adjustment is performed on the lens group LG3, the other lens groups are not affected; therefore, as with the case of the objective 10 according to embodiment 1, the eccentricity adjustment operation of an objective can be performed in the assembling process in a relatively easy manner.

The interval adjustment of the objective 40 is performed for the space between the first group G1 and the second group G2 using a method similar to that used for the objective 10.

Therefore, in regard to the objective 40 according to the present embodiment, as with the case of the objective 10 according to embodiment 1, interval adjustment can be performed by disassembling and reassembling the objective within the scope of minimal necessity. Therefore, it is possible to reduce the burden which would be incurred by operations needed for interval adjustment for the objective performed during the assembling process.

What is claimed is:

1. An objective comprising:
    a first group including a plurality of lens groups arranged at a predetermined interval;
    a second group composed of a single lens-group;
    a pressing ring which is screwed in, the pressing ring being for fixing the first group; and
    an outer frame accommodating the first group, the second group, and the pressing ring, wherein
    the outer frame includes a first hole at a position facing the second group.

2. The objective according to claim 1, wherein the pressing ring is screwed into the outer frame.

3. The objective according to claim 1, wherein
    the outer frame includes a second hole at a position facing the pressing ring, and
    the pressing ring and the outer frame are each screwed into a fixing member inserted in the second hole.

4. The objective according to claim 1, further comprising an interval adjustment member for adjusting an interval between the first group and the second group.

5. The objective according to claim 4, further comprising an inner frame for supporting the second group, wherein the interval adjustment member is located between the pressing ring and the inner frame.

6. The objective according to claim 4, wherein
    the outer frame comprises:
        a first outer frame for accommodating the first group and the pressing ring; and
        a second outer frame screwed into the first outer frame, the second outer frame being for accommodating the second group, wherein
    the interval adjustment member is located between the first outer frame and the second outer frame.

7. The objective according to claim 1, wherein the outer frame accommodates in sequence the first group, the pressing ring, and the second group, so that they are arranged in order of closer position to an object.

8. An objective assembling method comprising:
    inserting a plurality of lens groups into an outer frame;
    screwing in a pressing ring, and fixing the plurality of lens groups within the outer frame by using the pressing ring; and
    locating, within the outer frame, a single lens-group for which eccentricity is to be adjusted.

9. The objective assembling method according to claim 8, further comprising:
    after inserting the plurality of lens groups and before fixing the plurality of lens groups, locating an inner frame for supporting the single lens-group at a position at which it faces a hole provided at the outer frame.

10. The objective assembling method according to claim 8, wherein
    inserting the plurality of lens groups includes inserting the plurality of lens groups from an image side into an outer frame, and
    fixing the plurality of lens groups within the outer frame by using the pressing ring includes fixing the plurality of lens groups by using a force that is applied from an image side by the pressing ring.

* * * * *